(12) United States Patent
Lee et al.

(10) Patent No.: US 10,607,321 B2
(45) Date of Patent: Mar. 31, 2020

(54) ADAPTIVE SHARPNESS ENHANCEMENT CONTROL

(71) Applicant: INTEL CORPORATION, Santa Clara, CA (US)

(72) Inventors: Teahyung Lee, Chandler, AZ (US); Jong Dae Oh, Folsom, CA (US); Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 769 days.

(21) Appl. No.: 15/189,945

(22) Filed: Jun. 22, 2016

(65) Prior Publication Data

US 2017/0372456 A1 Dec. 28, 2017

(51) Int. Cl.
*G06K 9/00* (2006.01)
*G06T 5/00* (2006.01)
*G06T 5/40* (2006.01)
*G06T 5/10* (2006.01)

(52) U.S. Cl.
CPC ............. *G06T 5/003* (2013.01); *G06T 5/002* (2013.01); *G06T 5/10* (2013.01); *G06T 5/40* (2013.01); *G06T 2207/10016* (2013.01); *G06T 2207/20056* (2013.01); *G06T 2207/20076* (2013.01); *G06T 2207/20084* (2013.01)

(58) Field of Classification Search
CPC ...................................................... G06T 5/003
See application file for complete search history.

(56) References Cited

U.S. PATENT DOCUMENTS

| | | | |
|---|---|---|---|
| 2010/0027914 A1* | 2/2010 | Terada | G06T 3/40 382/299 |
| 2013/0141641 A1* | 6/2013 | Wu | H04N 5/208 348/425.1 |
| 2014/0037216 A1* | 2/2014 | Kumar | G06K 9/00751 382/197 |
| 2017/0084007 A1* | 3/2017 | Rakhshanfar | H04N 5/21 |

\* cited by examiner

*Primary Examiner* — Oneal R Mistry
(74) *Attorney, Agent, or Firm* — Green, Howard & Mughal LLP.

(57) ABSTRACT

Techniques related to video processing with adaptive sharpness enhancement are discussed. Such techniques may include determining a detail versus noise score for a video frame based on a noise level, a motion level, an average luma value, and spatial frequency information of the video frame and enhancing sharpness of the video frame based on sharpness enhancement control parameters generated based on the detail versus noise score for the video frame.

22 Claims, 6 Drawing Sheets

ADAPTIVE SHARPNESS ENHANCEMENT CONTROL

BACKGROUND

In video processing, sharpness enhancement may be provided in a video processing pipeline to improve the visual quality of video frames by boosting detail and edge information. However, such sharpness enhancement may re-amplify previously reduced noise in the video frames. For example, video frames may be de-noised and subsequent sharpness enhancement processing may re-amplify the noise and may thereby reduce the visual quality of the video frames.

It may be advantageous to perform effective and high quality sharpness enhancement in video processing to improve visual quality of the video and subsequent processing of such video. It is with respect to these and other considerations that the present improvements have been needed. Such improvements may become critical as the desire to capture and present high quality video becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
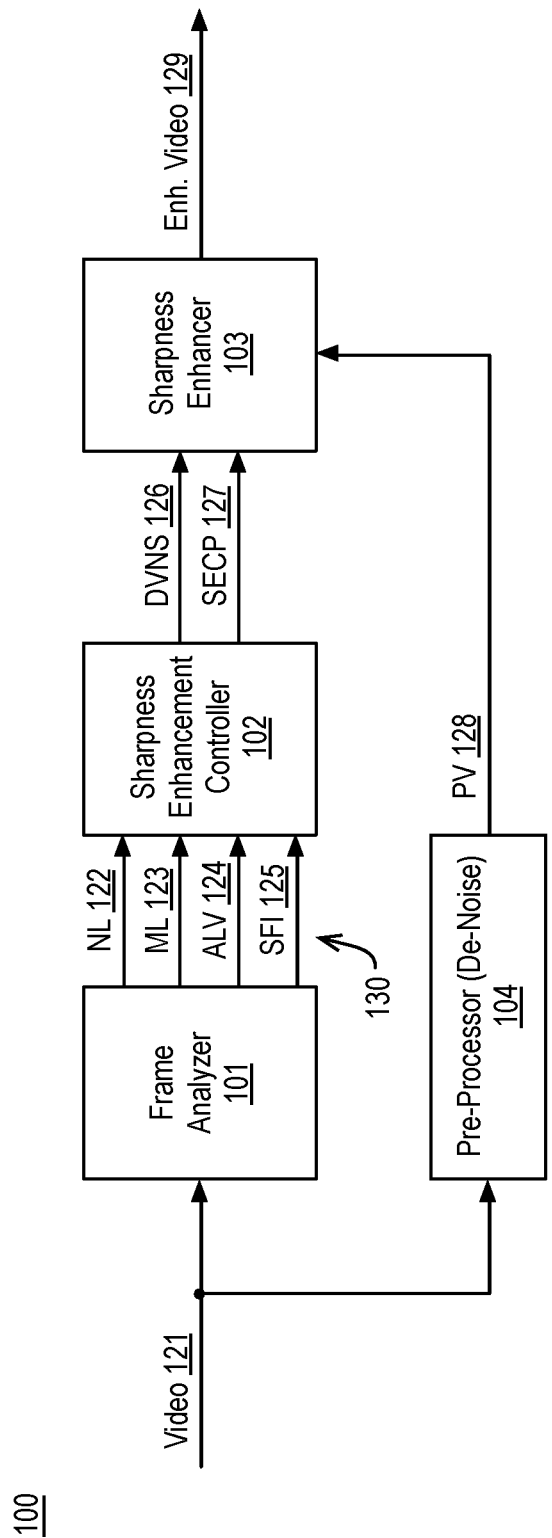
FIG. 1 is an illustrative diagram of an example system for providing video processing.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, and articles are described herein related to video processing and, in particular, to providing adaptive sharpness enhancement processing control for video.

As described above, it may be advantageous to perform effective and high quality sharpness enhancement in video processing to improve visual quality of the video and subsequent processing of such video. In some embodiments discussed herein, video processing may include determining a noise level, a motion level, an average luma value, and spatial frequency information for a video frame of a sequence of video frames. For example, such parameters may be generated by a frame analysis components of a video pipeline and/or other components of a video pipeline. In an embodiment, the noise level is a value corresponding to an estimated amount of noise in the frame, the motion level is a value corresponding to an estimated amount of motion in the frame (e.g., with respect to one or more prior frames of the video sequence), the average luma value is the average luma value for all pixel locations or representative pixel locations of the frame, and/or the spatial frequency information is a frequency domain histogram corresponding to the frame.

Based on the noise level, the motion level, the average luma value, and/or the spatial frequency information, a detail versus noise score may be determined for the video frame. The detail versus noise score may be a binary score (e.g., indicating the frame is a noise frame or a detail frame) or the detail versus noise score may be a score with granularity such that the detail versus noise score indicates a probability or likelihood that the frame is a detail frame or a noise frame. Any suitable scores may be used across any suitable range of available values. For example, an expected noise frame may have a value of zero and an expected detail frame may have a value of one with four, eight, ten, or the like, or more available scores between such maximum and minimum values.

In an embodiment, determining the detail versus noise score for the video frame includes determining a temporal noise reduction level for the video frame based on the noise level of the video frame and/or noise levels corresponding to a plurality of temporally adjacent frames of the video sequence, determining a spatial random noise likelihood and a detail level likelihood for the video frame based on the motion level, the spatial frequency information, and the average luma value, generating a candidate detail versus noise score for the video frame based on the temporal noise reduction level, the spatial random noise likelihood, and the detail level likelihood, and performing temporal filtering of the candidate detail versus noise score for the video frame based on candidate detail versus noise scores for temporally adjacent frames of the video sequence.

For example, in the context of binary detail versus noise scoring, a voting process or the like may be used to temporally filter the candidate detail versus noise scores. In an embodiment, prior frames are analyzed to determine whether the detail versus noise score for the current frame should be temporally filtered. For example, if a particular number of immediately temporally prior frames are detail frames and the current frame is determined to be a noise frame, the current frame may be changed to a detail frame (or vice versa) based on the other frames. Or, for example, if, in a particular number of immediately temporally prior frames, the number of detail frames exceeds the number of noise frames (e.g., by a threshold of one or more than one) and the current frame is determined to be a noise frame, the current frame may be changed to a detail frame (or vice versa) based on the other frames In the context of non-binary detail versus noise scoring, temporal filtering of the detail versus noise score for the current frame may include adjusting the detail versus noise score for the current frame based on detail versus noise scores for temporally adjacent frames. For example, a rolling average of the detail versus noise scores may be maintained and if the detail versus noise score for the current frame is outside of a threshold with respect to the rolling average, the detail versus noise score may be adjusted such that large swings in the detail versus noise scores are avoided. For example, adjusting the detail versus noise score may include changing the score for the current frame to the limit of the rolling average and the threshold (e.g., the rolling average plus or minus the threshold, as applicable), changing the score toward the rolling average, or the like.

Based on the detail versus noise score for the video frame, sharpness enhancement control parameters for the video frame may be generated or determined. The sharpness enhancement control parameters may be generated using any suitable technique or techniques. In the context of binary detail versus noise scores, noise frames may be assigned a first set of sharpness enhancement control parameters and detail frames may be assigned a second, different set of sharpness enhancement control parameters. For example, the first set of sharpness enhancement control parameters may provide less sharpness enhancement as compared to the second set of sharpness enhancement control parameters. In the context of non-binary detail versus noise scores, the detail versus noise score may be mapped to sharpness enhancement control parameters based on a predetermined mapping or the like. In such a context, the mapping may again provide greater sharpness enhancement for frames determined to have a higher detail versus noise score and less sharpness enhancement for frames determined to have a lower detail versus noise score.

Sharpness of the video frame may then be provided based on the determined sharpness enhancement control parameters to generate a sharpness enhanced video frames. Such sharpness enhancement may include boosting detail and edge information or the like. Using the adaptive sharpness enhancement control techniques discussed herein, sharpness enhancement may be adaptively applied more strongly to those frames that are likely to include more detail information and less strongly to those frames that are unlikely to include more detail information and/or more likely to include more noise. Such techniques may thereby advantageously provide stronger sharpness enhancement to those frames where such enhancement will improve visual quality and weaker or no sharpness enhancement to those frames where strong enhancement would increase noise (e.g., noise that was previously reduced in the video pipeline). The provided enhanced video frames may improve visual quality upon display and/or further processing performed on such enhanced video such as video encoding, object or face detection or recognition, or the like.

FIG. 1 is an illustrative diagram of an example system 100 for providing video processing, arranged in accordance with at least some implementations of the present disclosure. As shown in FIG. 1, system 100 may include a frame analyzer 101, a sharpness enhancement controller 102, a sharpness enhancer 103, and an optional pre-preprocessor 104. As shown, in some embodiments, pre-preprocessor 104 may provide a de-noise operation. As discussed herein, system 100 provides content adaptive sharpness enhancement and control for received video to provide enhanced video based on signal analysis of the received video. Such adaptive sharpness enhancement boosts detail and/or edge information for high quality (e.g., detail) content while avoiding noise amplification including re-amplification of previously de-noised content. For example, system 100 may use signal analysis of noise level, spatial frequency information, motion range information, and/or average pixel level (e.g., an average luma value) to detect content characteristics of detail/noise in a video input. Based on the signal analysis and/or the detected content characteristics, an adaptive sharpness enhancement level is applied to the video to boost sharpness in a balanced manner.

As shown, frame analyzer 101 and pre-preprocessor 104 of system 100 may receive video 121. System 100 may provide, for example, video processing to provide enhanced video 129 and system 100 may be implemented via a computer or computing device or the like. As discussed further herein, system 100 may provide or may be incorporated into a video processing pipeline. For example, system 100 may provide enhanced video 129 for video coding, for presentment to a user, for object or face detection or recognition, or any suitable video processing. System 100 may be implemented via any suitable device such as, for example, a personal computer, a laptop computer, a tablet, a phablet, a smart phone, a digital camera, a gaming console, a wearable device, a display device, an all-in-one device, a two-in-one device, or the like and/or any suitable platform such as a mobile platform or the like. For example, as used herein, a system, device, computer, or computing device may include any such device or platform. Furthermore, system 100 may be implemented as hardware, software, or a combination thereof. In an embodiment, frame analyzer 101, pre-processor 104, and sharpness enhancer are implemented in hardware and sharpness enhancement controller 102 is implemented in software.

As discussed, frame analyzer 101 and pre-preprocessor 104 may receive video 121. Video 121 may include any suitable video frames, video pictures, sequence of video frames, group of pictures, groups of pictures, video data, or the like in any suitable resolution. For example, video 121 may be video graphics array (VGA), high definition (HD), Full-HD (e.g., 1080 p), or 4K resolution video, or the like. Furthermore, video 121 may include any number of video frames, sequences of video frames, pictures, groups of pictures, or the like. Techniques discussed herein are discussed with respect to video frames and sequences of video frames for the sake of clarity of presentation. However, such video frames and sequences of video frames may be characterized as pictures, groups of pictures, video scenes, or the like.

As shown in FIG. 1, frame analyzer 101 may determine, for individual video frames of video 121, video analysis parameters 130. Although discussed with respect to video analysis parameters 130 being generated for each or representative individual video frames of video 121, video analysis parameters 130 may be generated on a sequence of video frames level or a scene level or the like. Video analysis parameters 130 may include any suitable parameters for evaluating detail and noise in a video frame shown, video analysis parameters 130 may include one or more of a noise level (NL) 122, a motion level (ML) 123, an average luma value (ALV) 124, and spatial frequency information (SFI) 125. Video analysis parameters 130 for a frame of video 121 may be generated for a video frame of video 121 based on the video frame itself and/or other video frames of video 121 such as temporally adjacent video frames (e.g., one or more temporally prior frames and/or one or more temporally subsequent frames).

Furthermore, video analysis parameters 130 may be generated by frame analyzer 101, as shown, and/or other components of system 100. For example, one or more of video analysis parameters 130 may be generated by system 100 during pre-processing or other processing of video 121. For example, noise level 122 may be generated by pre-preprocessor 104 of system 100 during de-noise processing, motion level 123 may be generated by a motion analysis component of system 100, and so on. As discussed, video analysis parameters 130 may include one or more of noise level 122, a motion level 123, an average luma value 124, and spatial frequency information 125. Video analysis parameters 130 may also include other values, parameters, or statistics corresponding to video 121 such as picture variance, spatial complexity, temporal correlation, and the like.

Frame analyzer 101 and/or other components of system 100 may determine video analysis parameters 130 using any suitable technique or techniques. For example, video analysis parameters 130 may be generated for each video frame of video 121 including a current or target video frame. In an embodiment, noise level 122 is a measure (e.g., a single value) of an amount of noise in the current or target video frame. For example, noise level 122 may be a noise level estimation for the current or target video frame. Noise level 122 may be provided by frame analyzer 101, pre-processor 104, or another component of system 100. In an embodiment, noise level 122 is a single value indicating a difference between the current or target frame before and after de-noise processing has been applied. As shown, in an embodiment, pre-processor 104 may optionally generate pre-processed video 128. Pre-processor 104 may provide de-noise operations to generate pre-processed video 128 and/or other pre-processing operations such as color enhancement or the like.

In an embodiment, motion level 123 is a measure (e.g., a single value) of a degree or level of motion in the current or target frame relative to an immediately temporally prior video frame and/or other temporally adjacent video frames. Motion level 123 may be provided by frame analyzer 101 or another component of system 100. In other embodiments, motion level 123 may provide additional details of motion in the current or target frame such as motion levels for slices, blocks, or regions of the current or target frame. However, a single value or similar measure of motion level or a degree of motion in the current or target frame may provide sufficient information for generating sharpness enhancement control parameters as discussed herein and advantages such as lower computation complexity.

In an embodiment, average luma value 124 is a measure (e.g., a single value) of the average luma value of the current or target frame. For example, average luma value 124 may be an average of the luma values of all pixels in the current or target frame. Average luma value 124 may also be characterized as an average pixel level of the current or target frame. Average luma value 124 may be provided by frame analyzer 101 or another component of system 100. Although discussed with respect to average luma value 124, in other embodiments, average color components of the current or target frame may also be evaluated by frame analyzer 101 and provided to sharpness enhancement controller 102.

Spatial frequency information 125 may include any suitable spatial frequency information corresponding to the current or target frame. In an embodiment, spatial frequency information 125 is a frequency domain histogram corresponding to the current or target frame. For example, the current or target frame may be converted from the spatial domain to the frequency domain (e.g., using a Fast Fourier Transform or the like) and a histogram may be generated that counts occurrences of particular features of the current or target frame in the frequency domain and provides the counts of occurrences as spatial frequency information 125. Spatial frequency information 125 may be provided by frame analyzer 101 or another component of system 100.

Video analysis parameters 130 including one or more of noise level 122, motion level 123, average luma value 124, and spatial frequency information 125, and/or additional parameters may be received by sharpness enhancement controller 102 from frame analyzer, memory storage (not shown), and/or other components of system 100. Based on video analysis parameters 130, sharpness enhancement controller 102, generates detail versus noise scores 126 for video 121 such as a detail versus noise score for each frame of video 121, for each scene of video 121, or the like.

As shown, sharpness enhancement controller 102 may provide detail versus noise scores 126 to sharpness enhancer 103. In such embodiments, sharpness enhancer 103 determines sharpness enhancement control parameters 127 for video 121 such as a set of sharpness enhancement control parameters 127 for each frame of video 121, each scene of video 121, or the like. In other embodiments, sharpness enhancement controller 102 determines sharpness enhancement control parameters 127 and provides them to sharpness enhancer 103. In such embodiments, sharpness enhancement controller 102 may not provide detail versus noise scores 126 to sharpness enhancer 103.

In any event, as discussed, sharpness enhancement controller 102 may generate detail versus noise scores 126 based on one or more of noise level 122, motion level 123, average luma value 124, and spatial frequency information 125, and/or additional parameters. Sharpness enhancement controller 102 may generate detail versus noise scores 126 using any suitable technique or techniques such as those discussed herein with respect to FIGS. 2 and 5 and elsewhere herein. For example, sharpness enhancement controller 102 may provide detail/noise detection for frames (or scenes) of video 121 based on such received parameters. Based on the detection information (e.g., detail versus noise scores 126 or the like), adaptive sharpness enhancement (e.g., an adaptive sharpness enhancement level based on the detected detail/noise information) may be provided by system 100.

Figure 2:
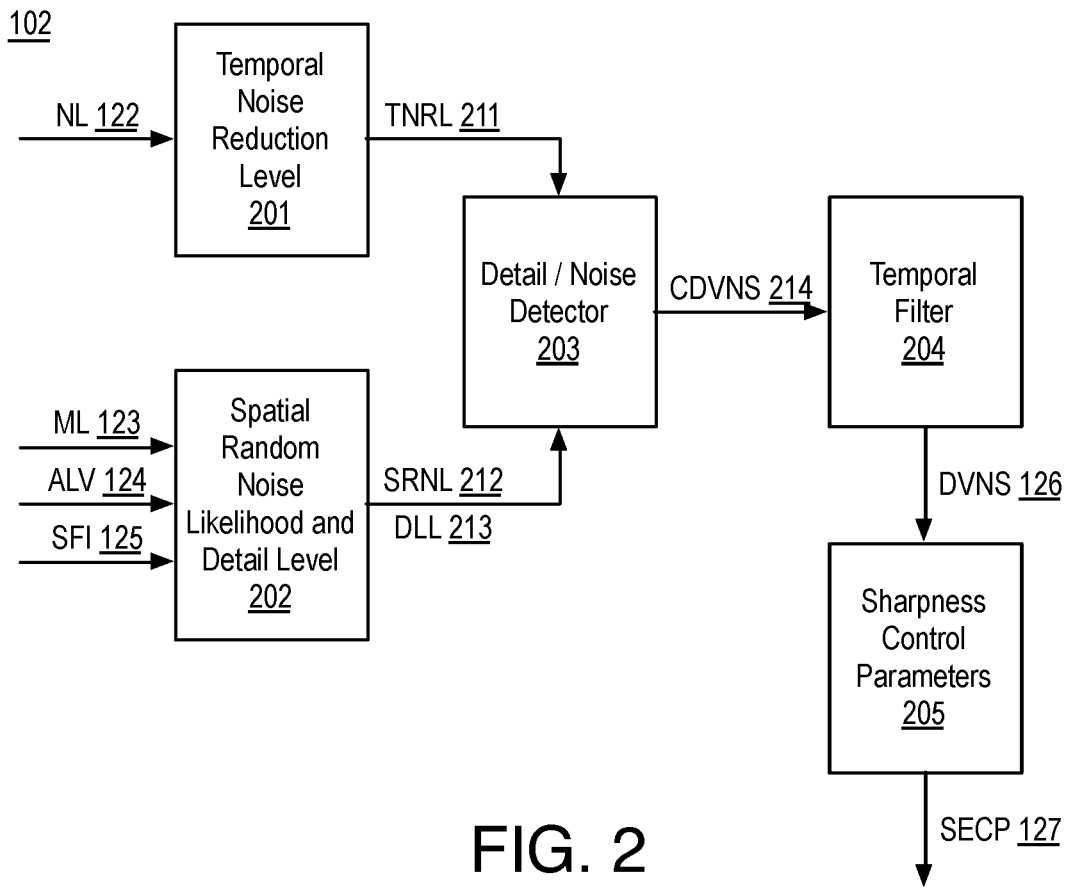
FIG. 2 illustrates an example sharpness enhancement controller.

FIG. 2 illustrates an example sharpness enhancement controller 102, arranged in accordance with at least some implementations of the present disclosure. As shown in FIG. 2, sharpness enhancement controller 102 may include a temporal noise reduction level module 201, a spatial random noise likelihood and detail level module 202, a detail/noise detector 203, a temporal filter 204, and a sharpness control parameters module 205. As discussed, in some embodiments, sharpness enhancement controller 102 may provide sharpness enhancement control parameters 127 (e.g., to sharpness enhancer 103, please refer to FIG. 1) as shown. In other embodiments, sharpness enhancement controller 102 may provide detail versus noise scores 126 (e.g., to sharpness enhancer 103). In such embodiments, sharpness control parameters module 205 may not be implemented by sharpness enhancement controller 102. Instead, sharpness control parameters module 205 may be implemented by sharpness enhancer 103.

As shown, temporal noise reduction level module 201 may receive noise level 122 and temporal noise reduction level module 201 may generate temporal noise reduction level (TNRL) 211. Temporal noise reduction level module 201 may generate temporal noise reduction level 211 using any suitable technique or techniques. In an embodiment, temporal noise reduction level 211 provides a measure (e.g., a single value) of an amount of noise in the current or target video frame. In an embodiment, temporal noise reduction level 211 may provide an estimate as to the amount of noise reduced temporally in the current or target video frame.

Also as shown, spatial random noise likelihood and detail level module 202 may receive motion level 123, average luma value 124, and spatial frequency information 125 and spatial random noise likelihood and detail level module 202 may generate a spatial random noise likelihood (SRNL) 212 and a detail level likelihood (DLL) 213. Spatial random noise likelihood and detail level module 202 may generate spatial random noise likelihood 212 and detail level likelihood 213 using any suitable technique or techniques. In an embodiment, spatial random noise likelihood 212 may provide a likelihood or probability that the current or target frame is a noise frame or has a stronger noise component as compared to a detail component. In an embodiment, detail level likelihood 213 may provide a likelihood or probability that the current or target frame is a detail frame or has a stronger detail component as compared to a noise component.

For example, spatial random noise likelihood 212 and/or detail level likelihood 213 may be generated based on a Gaussian checking mechanism implemented based on motion level 123, average luma value 124, and spatial frequency information 125 for the current or target frame. In an embodiment, the shape of the distribution of spatial frequency information 125 (e.g., in the spatial domain) may be provided to a checking mechanism or mapping function (e.g., along with motion level 123 and average luma value 124) to determine whether the shape of the distribution is more likely to be associated with a noise frame or a detail frame. Such checking, testing, or mapping may be based on a pretrained mapping, a hypothesis testing algorithm, or the like. Spatial random noise likelihood 212 and detail level likelihood 213, for a current or target frame, may include any suitable value from any suitable range of values. In an embodiment, spatial random noise likelihood 212 and/or detail level likelihood 213 are binarized to indicate either a spatial random noise likelihood 212 or detail level likelihood 213 for the current or target frame (e.g., the frame is either likely to be a noise frame or a detail frame). In other embodiments, spatial random noise likelihood 212 and/or detail level likelihood 213 provide granularity across a range of possible values. For example, spatial random noise likelihood 212 and/or detail level likelihood 213 may provide percentage likelihoods, or the like.

As shown, temporal noise reduction level 211, spatial random noise likelihood 212, and/or detail level likelihood 213 are provided to detail/noise detector 203, which may generate candidate detail versus noise scores 214. Detail/noise detector 203 may generate candidate detail versus noise scores 214 using any suitable technique or techniques. For example, detail/noise detector 203 may map or evaluate temporal noise reduction level 211, spatial random noise likelihood 212, and/or detail level likelihood 213 to generate candidate detail versus noise scores 214. For example, a current or target frame having higher levels of temporal noise reduction and spatial random noise likelihood and lower levels of detail level likelihood may be provided a lower candidate detail versus noise score while a current or target frame having lower levels of temporal noise reduction and spatial random noise likelihood and higher levels of detail level likelihood may be provided a higher candidate detail versus noise score. Although discussed with respect to candidate detail versus noise scores 214 having higher scores indicating greater likelihood of detail and lower scores indicating a greater likelihood of noise, candidate detail versus noise scores 214 may provide the opposite scoring (e.g., higher scores indicating greater likelihood of noise) or any suitable scoring system.

Furthermore, candidate detail versus noise scores 214 may be binarized or provided at a higher level of granularity as discussed elsewhere herein. In some embodiments, candidate detail versus noise scores 214 provide an indication of whether frames are determined to be noise frames or detail frames. Such determinations may be indicated by signaling a frame is noise or detail using a binary value. In other embodiments, candidate detail versus noise scores 214 provide a likelihood value corresponding to now likely the current or target frame is to be a detail frame. For example, such scores may be provided across a range of 0 to 100, 0 to 255, 0 to 15, or the like.

As shown, candidate detail versus noise scores 214 may be provided to temporal filter 204. In another embodiment, temporal filter 204 may not be provided. In embodiments where temporal filter 204 is provided, temporal filter 204 receives candidate detail versus noise scores 214 and provides temporal filtering to generate detail versus noise scores 126. In examples where no temporal filtering is provided, candidate detail versus noise scores 214 may provide detail versus noise scores 126. For example, temporal filter 204 may provide consistency in detail versus noise scores 126 such that short term false positives (e.g., a false noise frame or a false detail frame may be reduced or eliminated). Such temporal filtering may be provided using any suitable technique or techniques. In an embodiment, temporal filter 204 may implement voting process based temporal filtering.

Figure 3:
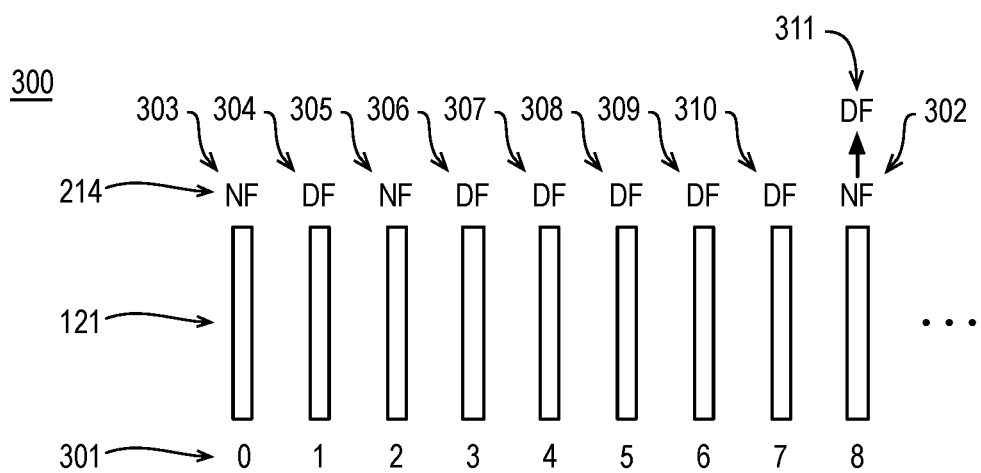
FIG. 3 illustrates example temporal filtering.

FIG. 3 illustrates example temporal filtering 300, arranged in accordance with at least some implementations of the present disclosure. For example, temporal filtering 300 may be provided by temporal filter 204. In the example of FIG. 3, binary detail versus noise scoring is provided (e.g., a frame of video is determined to be either a detail frame or a noise frame). As shown, video 121 having a temporal order indicated by frame indices 301 may have candidate detail versus noise scores 214 (e.g., as generated by detail/noise detector 203). As shown, frames 2 and 3-7 have candidate detail versus noise scores 214 indicating detail frames and frames 0 and 2 have candidate detail versus noise scores 214 indicating noise frames.

Also as shown, based on candidate noise frame indicator 302 temporally following being candidate detail frame indicators 303-310, candidate noise frame indicator 302 may be changed to detail frame indicator 311 for inclusion in detail versus noise scores 126. For example, candidate noise frame indicators for frames 0-7 may be unchanged in detail versus noise scores 126 (e.g., as compared to candidate detail versus noise scores 214) while the candidate noise frame indicator for frames 8 is changed in detail versus noise scores 126 (e.g., as compared to candidate detail versus noise scores 214). Although illustrated with respect to changing a noise frame indicator to a detail frame indicator, temporal filtering 300 may be applied to change both from noise to detail and detail to noise as needed.

In an embodiment, temporal filtering 300 may include providing a moving window along video 121 and analyzing candidate detail versus noise scores 214 within the window to determine whether any scores within the window are to be changed. For example, if a detail/noise score for a current frame does not match the score for a number of frames immediately prior to the current frame, the score of the current frame may be changed. In an embodiment, the detail/noise score for a current frame may only be changed if it does not match the score for a number of frames immediately prior to the current frame such that the number of frames meets and/or exceeds a threshold number. The threshold number may be any suitable number such as three frames, four frames, five frames, or more. For example, with reference to FIG. 3, noise frame indicator 302 may be changed to detail frame indicator 311 based on or in response to detail frame indicators 306-310 all indicating detail frames (e.g., such that the number of frames immediately prior to the current frame all have an opposite score and such that the number meets or exceeds a threshold). For example, since the number of frames having detail frame indicators 306-310 is five any threshold less than or equal to five would be met. If the threshold were six, the example of FIG. 3 would not provide for changing noise frame indicator 302 to a detail frame indicator.

In an embodiment, temporal filtering 300 may again include providing a moving window along video 121 and analyzing candidate detail versus noise scores 214 within the window to determine whether any scores within the window are to be changed. For example, if a detail/noise score for a number of frames immediately prior to a current frame out votes the current frame, the detail versus noise score for the current frame is changed. In an embodiment, the detail/noise score for a current frame may only be changed if it does not match the score determined by a vote of a number of previous frames. For example, if seven previous frames are used in the example of FIG. 3, there are six detail score frames (e.g., frames 1 and 3-7) and one noise frame (e.g., frame 2). In some embodiment, the current frame may also be included in the vote. In such embodiments, the vote would be six to two in favor of detail frames and, based on the vote, noise frame indicator 302 may be changed to detail frame indicator 311. In an embodiment, a simple majority vote is used. In an embodiment, the difference between the vote may have to meet and/or exceed a threshold such as two, three, four, or the like. In the given example, the vote difference is four (e.g., six minus two), which would meet or exceed a threshold of four or less. The discussed number of previous frames and threshold (e.g., a simple majority vote would have a threshold of one) may include any suitable value or values.

Figure 4:
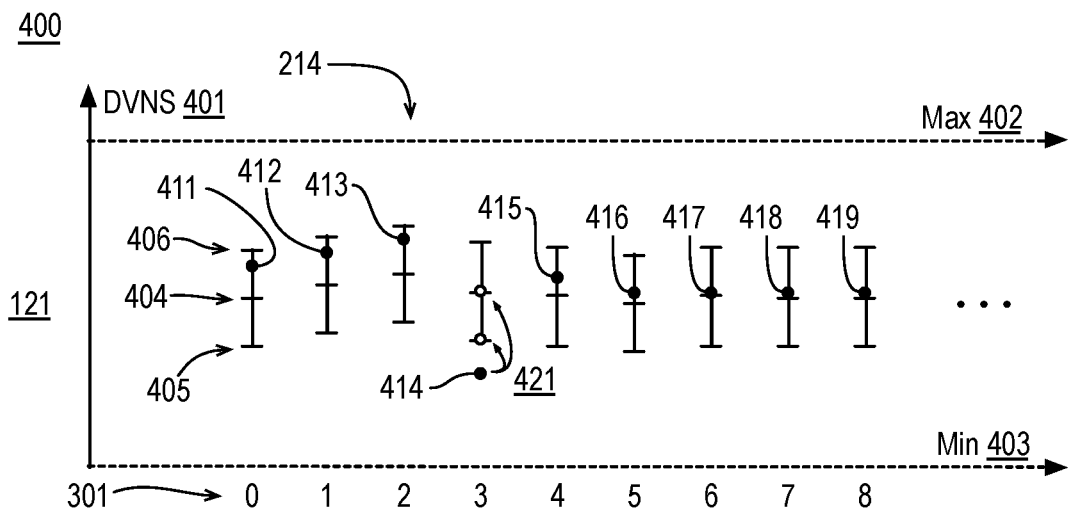
FIG. 4 illustrates example temporal filtering.

FIG. 4 illustrates example temporal filtering 400, arranged in accordance with at least some implementations of the present disclosure. For example, temporal filtering 400 may be provided by temporal filter 204. In the example of FIG. 4, non-binary detail versus noise scoring 401 (e.g., scoring with numerical values, percentages, or the like over a range of available values) is provided (e.g., each frame of video has a detail versus noise score). As shown, video 121 (in FIG. 4, vertical bars representing video 121 have been removed for clarity) having a temporal order indicated by frame indices 301 may have candidate detail versus noise scores 214 (e.g., as generated by detail/noise detector 203).

As shown, frames 0-8 may each have a candidate detail versus noise score 411-419 of candidate detail versus noise scores 214 that may range between a minimum value (Min) 403 and a maximum value (Max) 402 such that, in this example, maximum value 402 indicates the highest likelihood the candidate detail versus noise score indicates a detail frame and minimum value 403 indicates the highest likelihood the candidate detail versus noise score indicates a noise frame.

Also as shown with respect to candidate detail versus noise score 411 corresponding to frame 0 of video 121 (e.g., although labeled as frame 0 in this example, frames prior to frame 0 have been processed), a rolling average 404 of candidate detail versus noise scores 214 (or detail versus noise scores 126) may be maintained at each or occasional frames of video 121. Furthermore, a top threshold 406 and a bottom threshold 405 may be provided around rolling average 404. Top threshold 406 may provide a threshold in a higher likelihood of detail direction and bottom threshold 405 may provide a threshold in a higher likelihood of noise direction. Top threshold 406 and bottom threshold 405 may be the same value or they may be different. Furthermore, top threshold 406 and bottom threshold 405 may be predetermined threshold values. As shown, rolling average 404, and values corresponding to rolling average 404 plus top threshold 406 and minus bottom threshold 405 may be maintained or determined for each frame of video 121 (in FIG. 4, only rolling average 404 plus top threshold 406 and minus bottom threshold 405 for frame 0 are labeled for the sake of clarity).

Based on rolling average 404, rolling average 404 plus top threshold 406 and minus bottom threshold 405 for respective frames, each candidate detail versus noise score 411-419 may be evaluated. For example, as shown with respect to frames 0-2 and 4-8, candidate detail versus noise scores 411, 412, 413, 415, 416, 417, 418, and 419 are detail versus noise scores that are within a range as provided around rolling average 404. In the illustrated example, each of candidate detail versus noise scores 411, 412, 413, 415, 416, 417, 418, and 419 are between rolling average 404 and rolling average 404 plus top threshold 406 and no changes are made to them when providing detail versus noise scores 126 from candidate detail versus noise scores 214. Similarly, any candidate detail versus noise scores between rolling average 404 and rolling average 404 minus bottom threshold 406 may also be accepted without change.

However, as shown with respect to candidate detail versus noise score 414, any candidate detail versus noise score that is outside of the range provided by rolling average 404 plus top threshold 406 and rolling average 404 minus bottom threshold 405 for the corresponding frame (e.g., for frame 3 in this example) may be moved toward rolling average 404 via move 421. A candidate detail versus noise score that outside of the discussed range may be moved toward the rolling average by any amount and/or using any suitable technique or techniques. In an embodiment, candidate detail versus noise score 414 is moved to rolling average 404 corresponding to frame 3 of video 121). In an embodiment, candidate detail versus noise score 414 is moved to rolling average 404 minus bottom threshold 405 corresponding to frame 3 of video 121). For example, candidate detail versus noise score 414 may be moved to a nearest edge provided by the range from rolling average 404 plus top threshold 406 to rolling average 404 minus bottom threshold 405. Rolling average 404 for a subsequent frame may then be based on the detail versus noise score after the shift. Such techniques may provide for the detection and reduction in the impact of false positives or false detections or the like. Furthermore, such techniques may provide for smoother shifts in enhanced video by mitigating large swings in the application of different sharpness enhancement parameters over time.

Returning to FIG. 2, as shown, in some embodiments, detail versus noise scores 126 after temporal filtering may be provided to sharpness control parameters module 205, which may generate sharpness enhancement control parameters 127 for video 121 (please refer to FIG. 1). Sharpness control parameters module 205 may generate sharpness enhancement control parameters 127 using any suitable technique or techniques. As shown, in some embodiments, sharpness enhancement control parameters 127 are generated based on detail versus noise scores 126. In some embodiments, sharpness enhancement control parameters 127 are generated based on detail versus noise scores 126 and motion level 123. For example, depending on motion level 123, the degree of sharpness enhancement can be adaptively applied. In an embodiment, in response to increased or higher levels of motion level 123, more sharpness enhancement or the application of sharpness enhancement is provided based on the adjustment of sharpness enhancement control parameters 127.

As discussed, in some embodiments, detail versus noise scores 126 are binary scores (e.g., indicating whether each frame is a detail frame or a noise frame). In such embodiments, sharpness enhancement control parameters 127 may be provided such that a first set of sharpness enhancement control parameters are selected and provided when the current or target frame is determined to be a detail frame and a second, different, set of sharpness enhancement control parameters are selected and provided when the current or target frame is determined to be a noise frame. For example, the first set of sharpness enhancement control parameters (e.g., corresponding to a detail frame) may provide more sharpness enhancement (e.g., greater detail and/or edge enhancement) than the second set of sharpness enhancement control parameters (e.g., corresponding to a noise frame).

Also as discussed, in other embodiments, detail versus noise scores 126 provide values of indicative of how likely a current or target frame is to be a detail frame (or a noise frame) ranging from a minimum value to a maximum value. In such embodiments, sharpness enhancement control parameters 127 may be provided such that a detail versus noise score for a current or target frame may be mapped to the sharpness enhancement control parameters for the frame. For example, a pretrained mapping may be provided that selects sharpness enhancement control parameters that provide increasing sharpness enhancement for detail versus noise scores 126 that indicate a higher likelihood of a detail frame and decreasing sharpness enhancement for detail versus noise scores 126 that indicate a higher likelihood of a noise frame (e.g., lower likelihood of a detail frame). For example, a first set of sharpness enhancement control parameters that provide a minimum or no sharpness enhancement may be selected when the current or target frame indicates no likelihood of being a detail frame (and maximum likelihood of being a noise frame) and a second set of sharpness enhancement control parameters that provide a maximum sharpness enhancement may be selected when the current or target frame indicates a maximum likelihood of being a detail frame (and no likelihood of being a noise frame). Between such extremes, varying sharpness enhancement control parameters may be selected to provide varying levels of sharpness enhancement. Any suitable trajectory from such first and second sharpness enhancement control parameters may be provided such as a linear trajectory, a step-wise trajectory, or the like.

Returning now to FIG. 1, as discussed sharpness enhancement controller 102 or sharpness enhancer 103 may determine sharpness enhancement control parameters 127 and, as shown, sharpness enhancer 103 may implement sharpness enhancement to pre-processed video 128 (or video 121) based on sharpness enhancement control parameters 127 to generate enhanced video 129. Sharpness enhancer 103 may implement sharpness enhancement to pre-processed video 128 using any suitable technique or techniques. For example, sharpness enhancement may include edge and/or detail enhancement and/or other techniques including unsharp masking or the like. As discussed, such sharpness enhancement may be adaptively provided to frames of pre-processed video 128 based on sharpness enhancement control parameters 127 such that little or no sharpness enhancement is provided to noise frames and maximum or increased sharpness enhancement is provided to detail frames.

As is discussed further herein, enhanced video 129 may be provided by system 100 for further processing such as presentment to a user via a display, further pre-processing, encoding, or the like.

As discussed, system 100 provides adaptive control of sharpness enhancement based on detail/noise detection and other signal analysis (e.g., noise, spatial frequency, motion information) to provide optimal sharpness enhancement for frames or images of an input video. Such techniques may enhance detail or texture information with minimal or no noise level amplification. In some examples, de-noise pre-processing may also be provided prior to sharpness enhancement of frames. The adaptive sharpness enhancement discussed herein may provide de-noise and sharpness enhancement operations that do not re-amplify noise (in sharpness enhancement) that was previously reduced in de-noise.

Figure 5:
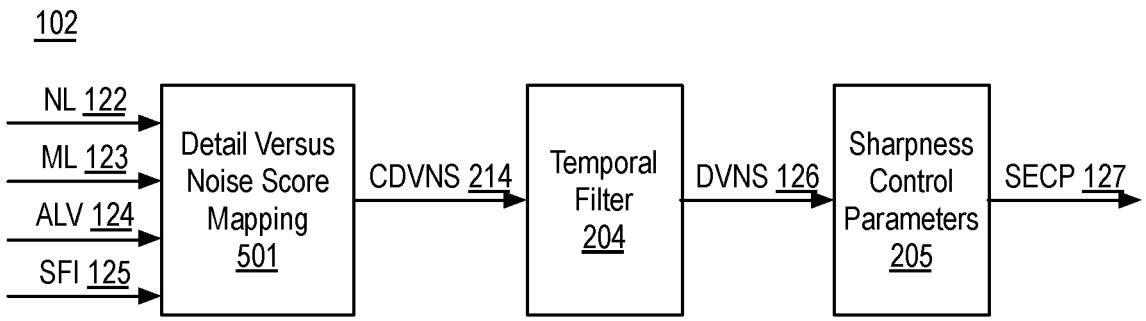
FIG. 5 illustrates another example sharpness enhancement controller.

FIG. 5 illustrates another example sharpness enhancement controller 102, arranged in accordance with at least some implementations of the present disclosure. As shown in FIG. 5, sharpness enhancement controller 102 may include a detail versus noise score mapping module 501, temporal filter 204, and sharpness control parameters module 205. As discussed, in some embodiments, sharpness enhancement controller 102 may provide sharpness enhancement control parameters 127 (e.g., to sharpness enhancer 103, please refer to FIG. 1) as shown. In other embodiments, sharpness enhancement controller 102 may provide detail versus noise scores 126 (e.g., to sharpness enhancer 103). In such embodiments, sharpness control parameters module 205 may not be implemented by sharpness enhancement controller 102. Instead, sharpness control parameters module 205 may be implemented by sharpness enhancer 103.

As shown, detail versus noise score mapping module 501 may receive noise level 122, motion level 123, average luma value 124, and spatial frequency information 125 and detail versus noise score mapping module 501 may generate candidate detail versus noise scores 214. Detail versus noise score mapping module 501 may generate candidate detail versus noise scores 214 using any suitable technique or techniques. In an embodiment, detail versus noise score mapping module 501 may implement a pretrained probability mapping from noise level 122, motion level 123, average luma value 124, and spatial frequency information 125 and detail versus noise score mapping module 501 to candidate detail versus noise scores 214. Such a mapping may be provided using any suitable technique or techniques such as machine learning techniques, neural network techniques, classifier techniques, or the like. For example, the mapping may be pretrained using a corpus of training images or frames and the offline trained model may be implemented by detail versus noise score mapping module 501 in real time. Candidate detail versus noise scores 214 may be binarized or provided at a higher level of granularity as discussed elsewhere herein.

As shown, candidate detail versus noise scores 214 may be provided to temporal filter 204, which may operate as discussed with respect to FIG. 2 and elsewhere herein. In another embodiment, temporal filter 204 may not be provided. As shown, when temporal filter 204 is provided, temporal filter 204 receives candidate detail versus noise scores 214 and provides temporal filtering to generate detail versus noise scores 126. In examples where no temporal filtering is provided, candidate detail versus noise scores 214 may provide detail versus noise scores 126.

Figure 6:
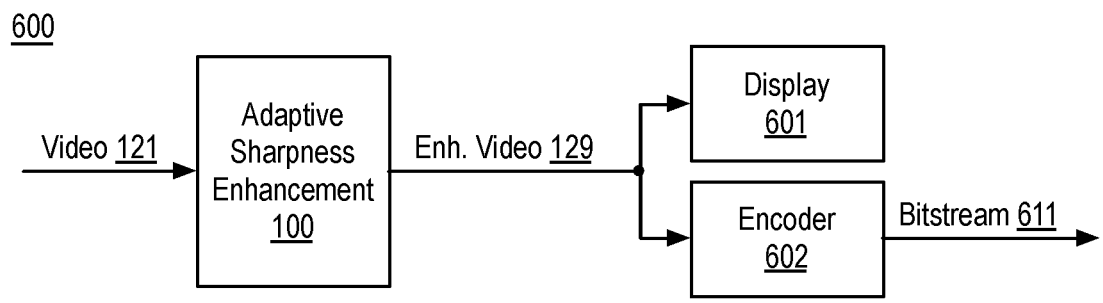
FIG. 6 illustrates an example device including an adaptive sharpness enhancement system.

FIG. 6 illustrates an example device 600 including adaptive sharpness enhancement system 100, arranged in accordance with at least some implementations of the present disclosure. As shown in FIG. 6, device 600 may include adaptive sharpness enhancement system 100 and a display and/or encoder 602. In addition or in the alternative, device 600 may include other processing components for processing enhanced video 129 such as an object detection component, a face detection component, an object recognition component, a face recognition component.

For example, adaptive sharpness enhancement system 100 may process video 121 to generate enhanced video 129 as discussed herein. Such enhanced video 129 may optionally be further processed (not shown) and provided to display 601 and/or encoder 602. For example, display 601 may display enhanced video to one or more users of device 600.

In addition or in the alternative, encoder 602 may receive enhanced video 129 and encoder 602 may encode enhanced video 129 to generate an encoded bitstream 611. For example, device 600 may generate bitstream 611 such that bitstream 611 is compatible with a video compression-decompression (codec) standard such as the H.264/MPEG-4 advanced video coding (AVC) standard, the MPEG-2 coding standard, the high efficiency video coding (HEVC) standard, the VP8 standard, the VP9 standard, or the like. Bitstream 611 may subsequently be stored to storage media and/or transmitted to a remote device.

Figure 7:
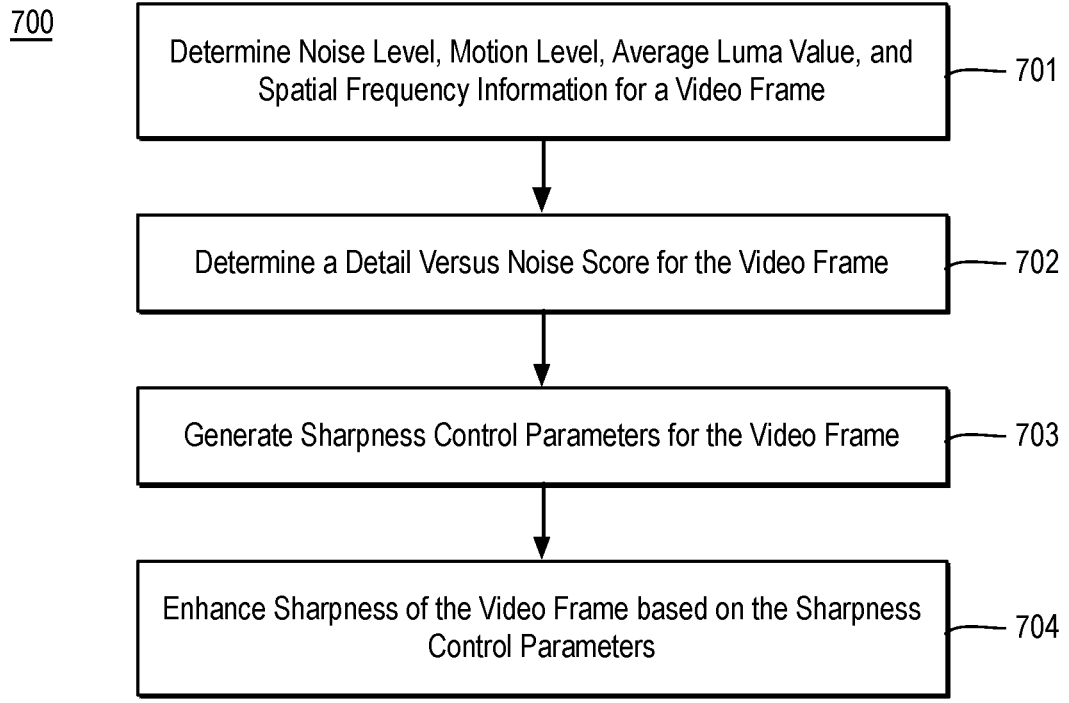
FIG. 7 is a flow diagram illustrating an example process for video processing.

FIG. 7 is a flow diagram illustrating an example process 700 for video processing, arranged in accordance with at least some implementations of the present disclosure. Process 700 may include one or more operations 701-704 as illustrated in FIG. 7. Process 700 may form at least part of a video processing pipeline. By way of non-limiting example, process 700 may form at least part of video processing as performed by any device or system as discussed herein. Furthermore, process 700 will be described herein with reference to system 800 of FIG. 8.

Figure 8:
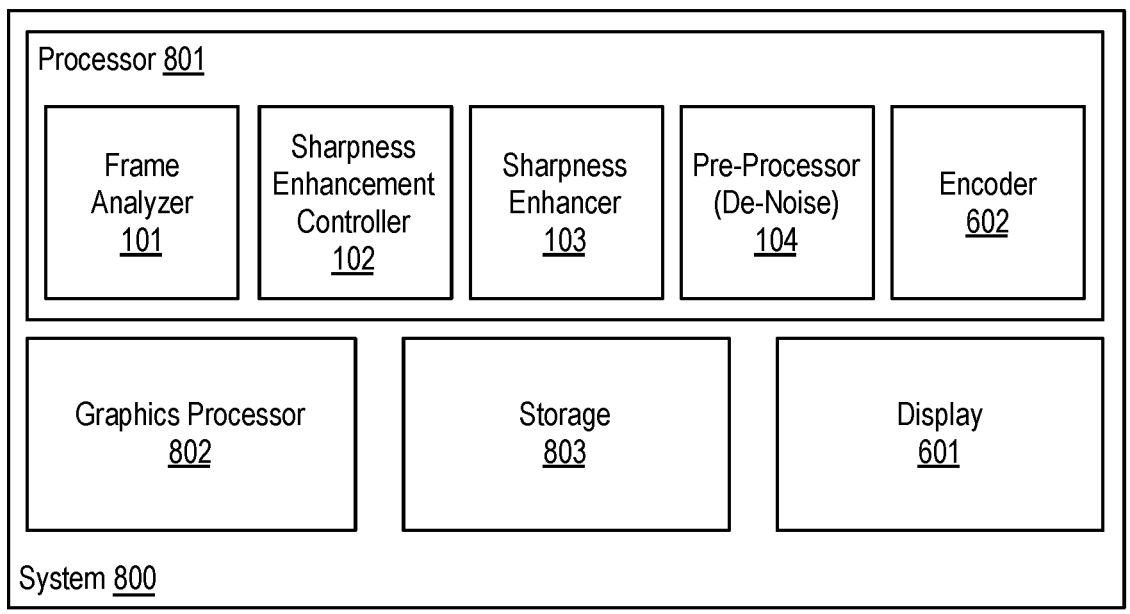
FIG. 8 is an illustrative diagram of an example system for video processing.

FIG. 8 is an illustrative diagram of an example system 800 for video processing, arranged in accordance with at least some implementations of the present disclosure. As shown in FIG. 8, system 800 may include display 601, a central processor 801, a graphics processor 802, and storage 803 (e.g., memory or storage media). Also as shown, processor 801 may include frame analyzer 101, sharpness enhancement controller 102, sharpness enhancer 103, pre-preprocessor 104, and encoder 602. In the example of system 800, storage 803 may store video data or related content such as video, video data, frames, frame data, noise levels, motion levels, average luma values, spatial frequency information, video analysis parameters, candidate detail versus noise scores, detail versus noise scores, sharpness enhancement control parameters, pre-processed video, enhanced video, and/or any other data as discussed herein.

As shown, in some examples, frame analyzer 101, sharpness enhancement controller 102, sharpness enhancer 103, pre-preprocessor 104, and encoder 602 may be implemented via processor 801. In other examples, one or more or portions of frame analyzer 101, sharpness enhancement controller 102, sharpness enhancer 103, pre-preprocessor 104, and encoder 602 may be implemented via graphics processor 802, or another processing unit such as a video processor, a video processing pipeline, or the like.

Graphics processor 802 may include any number and type of graphics processing units that may provide the operations as discussed herein. Such operations may be implemented via software or hardware or a combination thereof. For example, graphics processor 802 may include circuitry dedicated to manipulate video, video data, or the like obtained from storage 803. Central processor 801 may include any number and type of processing units or modules that may provide control and other high level functions for system 800 and/or provide any operations as discussed herein. Storage 803 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, storage 803 may be implemented by cache memory.

In an embodiment, one or more or portions of frame analyzer 101, sharpness enhancement controller 102, sharpness enhancer 103, pre-preprocessor 104, and encoder 602 may be implemented via an execution unit (EU) of graphics processor 802. The EU may include, for example, programmable logic or circuitry such as a logic core or cores that may provide a wide array of programmable logic functions. In an embodiment, one or more or portions of frame analyzer 101, sharpness enhancement controller 102, sharpness enhancer 103, pre-preprocessor 104, and encoder 602 may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 7, process 700 may begin at operation 701, where a noise level, a motion level, an average luma value, and spatial frequency information may be determined for a video frame of a sequence of video frames. The noise level, motion level, average luma value, and spatial frequency information may be determined for the video frame using any suitable technique or techniques. In an embodiment, the noise level, motion level, average luma value, and spatial frequency information may be determined for the video frame by frame analyzer 101 as implemented by processor 801. In an embodiment, the noise level is a measure of noise for the video frame, the motion level is a measure of motion for the video frame relative to one or more temporally prior video frames, the average luma value is an average of luma values for all pixels of the video frame, and the spatial frequency information is a frequency domain histogram for the video frame.

Processing may continue at operation 702, where a detail versus noise score may be determined for the video frame based on the noise level, the motion level, the average luma value, and the spatial frequency information. The detail versus noise score may be determined for the video frame using any suitable technique or techniques. In an embodiment, the detail versus noise score may be determined for the video frame by sharpness enhancement controller 102 as implemented by processor 801. In an embodiment, determining the detail versus noise score comprises mapping the noise level, the motion level, the average luma value, and the spatial frequency information to the detail versus noise score based on a pretrained probability mapping.

In an embodiment, determining the detail versus noise score for the video frame includes determining a temporal noise reduction level for the video frame based on the noise level of the video frame and multiple noise levels corresponding to multiple temporally adjacent frames of the video sequence, determining a spatial random noise likelihood and a detail level likelihood for the video frame based on the motion level, the spatial frequency information, and the average luma value, generating a candidate detail versus noise score for the video frame based on the temporal noise reduction level, the spatial random noise likelihood, and the detail level likelihood, and performing temporal filtering of the candidate detail versus noise score for the video frame based on candidate detail versus noise scores for the plurality of temporally adjacent frames of the video sequence.

The temporal filtering may be performed using any suitable technique or techniques. In an embodiment, the candidate detail versus noise score indicates a noise frame, candidate detail versus noise scores for a number of immediately temporally prior video frames all indicate detail frames, and temporal filtering the candidate detail versus noise score for the video frame comprises setting the detail versus noise score to indicate a detail frame in response to the number of immediately temporally prior video frames exceeding a threshold. In an embodiment, the candidate detail versus noise score indicates a noise frame, candidate detail versus noise scores a number of immediately temporarily prior video frames indicate a first number of detail frames and a second number of noise frames, and temporal filtering the candidate detail versus noise score for the video frame comprises setting the detail versus noise score to indicate a detail frame in response to the first number exceeding the second number by at least a threshold. Although discussed with respect to a noise frame being switched to a detail frame, similar temporal filtering may be provided to switch a detail frame or frames to noise frame or frames based on temporally prior video frames being noise frames.

In an embodiment, the candidate detail versus noise score has a value not within a predetermined threshold from a rolling average of probability of detail scores maintained for temporally prior video frames and the video frame, and temporal filtering the candidate detail versus noise score comprises moving the candidate detail versus noise score toward the rolling average of probability of detail scores to generate the detail versus noise score. The candidate detail versus noise score may be moved or shifted toward the rolling average using any suitable technique or techniques. In an embodiment, moving the candidate detail versus noise score toward the rolling average of probability of detail scores includes setting the detail versus noise score to a value equal to the rolling average of probability of detail scores minus the predetermined threshold. In an embodiment, moving the candidate detail versus noise score toward the rolling average of probability of detail scores includes setting the detail versus noise score to a value equal to the rolling average of probability of detail scores plus the predetermined threshold.

Processing may continue at operation 703, where sharpness enhancement control parameters may be generated for the video frame based on the detail versus noise score for the video frame. The sharpness enhancement control parameters may be generated for the video frame using any suitable technique or techniques. In an embodiment, the sharpness enhancement control parameters may be generated for the video frame by sharpness enhancement controller 102 as implemented by processor 801. In an embodiment, the sharpness enhancement control parameters may be generated for the video frame by sharpness enhancer 103 as implemented by processor 801. In an embodiment, the detail versus noise score is a binary detail versus noise score and the sharpness enhancement control parameters include a first set of sharpness enhancement control parameters when the binary detail versus noise score indicates the video frame is a noise frame and a second set of sharpness enhancement control parameters different than the first set when the binary detail versus noise score indicates the video frame is a detail frame. In an embodiment, the detail versus noise score is a probability of detail score and generating the sharpness enhancement control parameters comprises mapping the probability of detail score to the sharpness enhancement control parameters based on a pretrained mapping. In an embodiment, generating the sharpness enhancement control parameters is further based on the motion level for the video frame. For example, more or less sharpness enhancement may be provided in response to a greater motion level.

Processing may continue at operation 704, where sharpness of the video frame may be enhanced based on the sharpness enhancement control parameters to generate an enhanced video frame. The sharpness of the video frame may be enhanced using any suitable technique or techniques. In an embodiment, the sharpness of the video frame may be enhanced by sharpness enhancer 103 as implemented by processor 801. For example, the sharpness enhancement control parameters may provide increased sharpness enhancement for frames determined to be detail frames and decreased or no sharpness enhancement for frames determined to be noise frames. Such an enhanced video frame or frames may be further processed using any suitable technique or techniques. In an embodiment, the enhanced video frame is displayed by display 601. In an embodiment, the enhanced video frame is encoded by encoder 602 into a bitstream such as a standards compliant bitstream.

Process 700 may be repeated any number of times either in series or in parallel for any number video frames, sequences of video frames, or the like. As discussed, process 700 may provide for enhanced video. For example, the discussed techniques for video processing may provide sharpness enhanced video that boosts detail and/or edge information for detail content while avoiding noise amplification in noisy content.

Various components of the systems described herein may be implemented in software, firmware, and/or hardware and/or any combination thereof. For example, various components of the systems and/or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the processes or any operations discussed herein and/or any portions of the systems and/or devices discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 9:
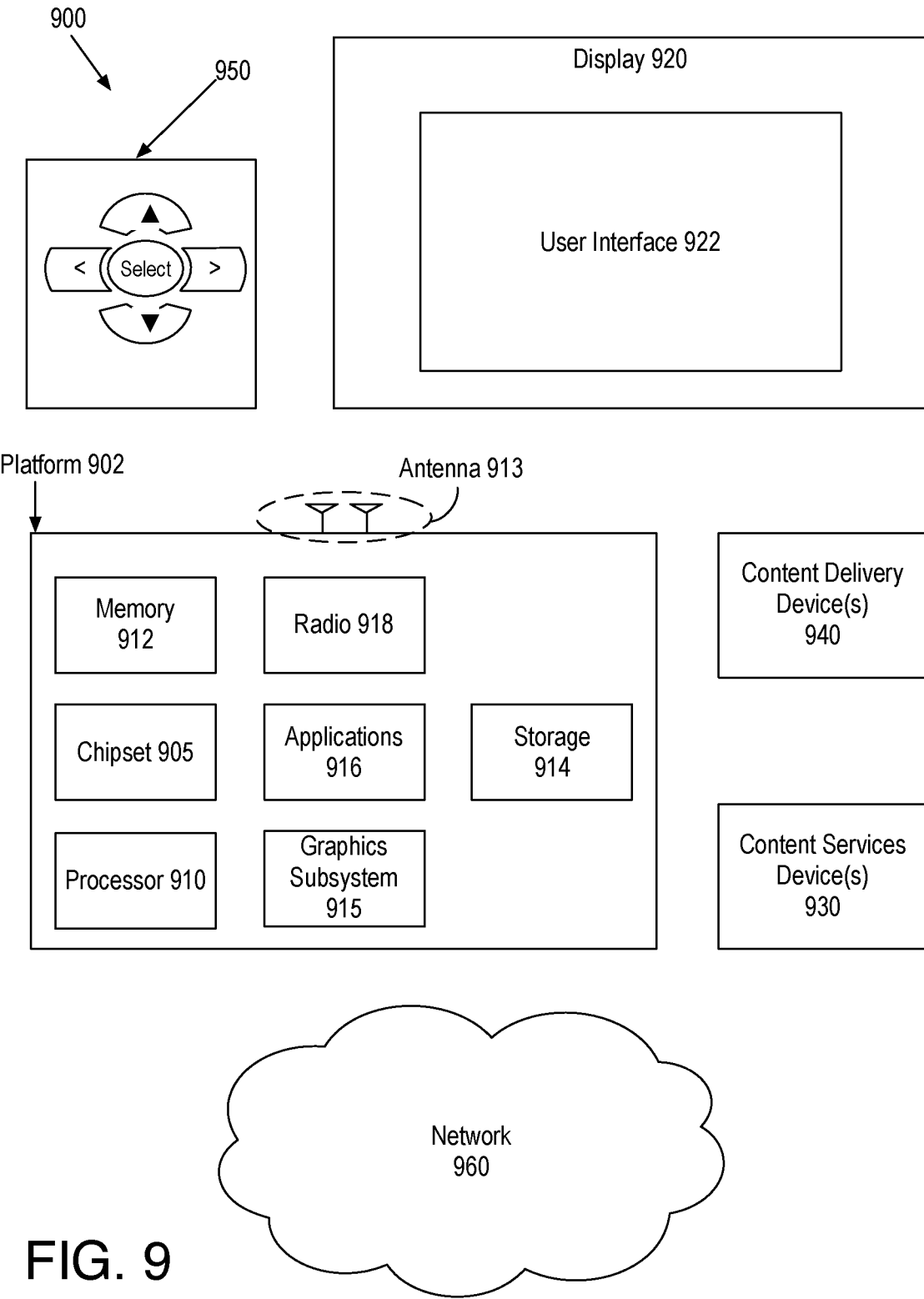
FIG. 9 is an illustrative diagram of an example system.

FIG. 9 is an illustrative diagram of an example system 900, arranged in accordance with at least some implementations of the present disclosure. In various implementations, system 900 may be a mobile system although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, antenna 913, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, and/or wireless HD compliant techniques. Graphics subsystem 915 may be integrated into processor 910 or chipset 905. In some implementations, graphics subsystem 915 may be a stand-alone device communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any television type monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of uni-directionally or bi-directionally communicating content between content providers and platform 902 and/display 920, via network 960 or directly. It will be appreciated that the content may be communicated uni-directionally and/or bi-directionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of may be used to interact with user interface 922, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 920) by movements of a pointer, cursor, focus ring, or other visual indicators displayed on the display. For example, under the control of software applications 916, the navigation features located on navigation may be mapped to virtual navigation features displayed on user interface 922, for example. In various embodiments, may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off" In addition, chipset 905 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the present disclosure.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
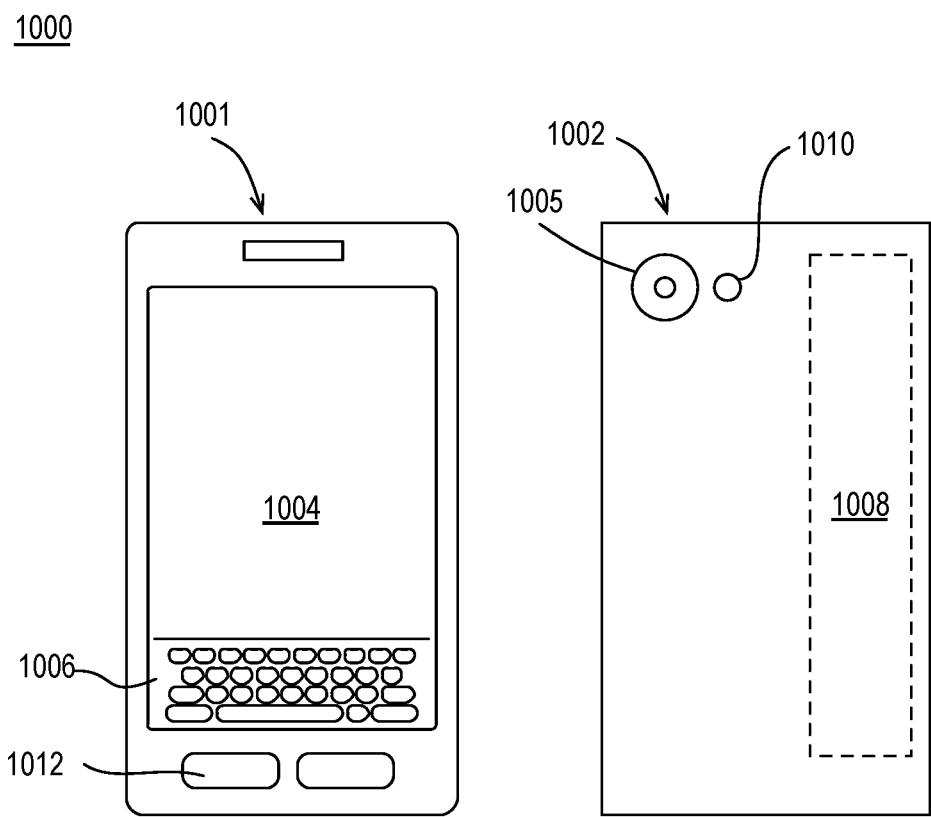
FIG. 10 illustrates an example device, all arranged in accordance with at least some implementations of the present disclosure.

As described above, system 900 may be embodied in varying physical styles or form factors. FIG. 10 illustrates an example small form factor device 900, arranged in accordance with at least some implementations of the present disclosure. In some examples, system 900 may be implemented via device 1000. In other examples, other systems or devices discussed herein may be implemented via device 1000. In various embodiments, for example, device 1000 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may include a housing with a front 1001 and a back 1002. Device 1000 includes a display 1004, an input/output (I/O) device 1006, and an integrated antenna 1008. Device 1000 also may include navigation features 1012. I/O device 1006 may include any suitable I/O device for entering information into a mobile computing device. Examples for I/O device 1006 may include an alphanumeric keyboard, a numeric keypad, a touch pad, input keys, buttons, switches, microphones, speakers, voice recognition device and software, and so forth. Information also may be entered into device 1000 by way of microphone (not shown), or may be digitized by a voice recognition device. As shown, device 1000 may include a camera 1005 (e.g., including a lens, an aperture, and an imaging sensor) and a flash 1010 integrated into back 1002 (or elsewhere) of device 1000. In other examples, camera 1005 and flash 1010 may be integrated into front 1001 of device 1000 or both front and back cameras may be provided. Camera 1005 and flash 1010 may be components of a camera module to originate image data processed into streaming video that is output to display 1004 and/or communicated remotely from device 1000 via antenna 1008 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following embodiments pertain to further embodiments.

In one or more first embodiments, a computer-implemented method for video processing comprises determining a noise level, a motion level, an average luma value, and spatial frequency information for a video frame of a sequence of video frames, determining a detail versus noise score for the video frame based on the noise level, the motion level, the average luma value, and the spatial frequency information, generating sharpness enhancement control parameters for the video frame based on the detail versus noise score for the video frame, and enhancing sharpness of the video frame based on the sharpness enhancement control parameters to generate an enhanced video frame.

Further to the first embodiments, determining the detail versus noise score for the video frame comprises determining a temporal noise reduction level for the video frame based on the noise level of the video frame and a plurality of noise levels corresponding to a plurality of temporally adjacent frames of the video sequence, determining a spatial random noise likelihood and a detail level likelihood for the video frame based on the motion level, the spatial frequency information, and the average luma value, generating a candidate detail versus noise score for the video frame based on the temporal noise reduction level, the spatial random noise likelihood, and the detail level likelihood, and performing temporal filtering of the candidate detail versus noise score for the video frame based on candidate detail versus noise scores for the plurality of temporally adjacent frames of the video sequence.

Further to the first embodiments, determining the detail versus noise score for the video frame comprises determining a temporal noise reduction level for the video frame based on the noise level of the video frame and a plurality of noise levels corresponding to a plurality of temporally adjacent frames of the video sequence, determining a spatial random noise likelihood and a detail level likelihood for the video frame based on the motion level, the spatial frequency information, and the average luma value, generating a candidate detail versus noise score for the video frame based on the temporal noise reduction level, the spatial random noise likelihood, and the detail level likelihood, and performing temporal filtering of the candidate detail versus noise score for the video frame based on candidate detail versus noise scores for the plurality of temporally adjacent frames of the video sequence, wherein the candidate detail versus noise score indicates a noise frame, candidate detail versus noise scores for a number of immediately temporally prior video frames all indicate detail frames, and temporal filtering the candidate detail versus noise score for the video frame comprises setting the detail versus noise score to indicate a detail frame in response to the number of immediately temporally prior video frames exceeding a threshold.

Further to the first embodiments, determining the detail versus noise score for the video frame comprises determining a temporal noise reduction level for the video frame based on the noise level of the video frame and a plurality of noise levels corresponding to a plurality of temporally adjacent frames of the video sequence, determining a spatial random noise likelihood and a detail level likelihood for the video frame based on the motion level, the spatial frequency information, and the average luma value, generating a candidate detail versus noise score for the video frame based on the temporal noise reduction level, the spatial random noise likelihood, and the detail level likelihood, and performing temporal filtering of the candidate detail versus noise score for the video frame based on candidate detail versus noise scores for the plurality of temporally adjacent frames of the video sequence, wherein the candidate detail versus noise score indicates a noise frame, candidate detail versus noise scores a number of immediately temporally prior video frames indicate a first number of detail frames and a second number of noise frames, and temporal filtering the candidate detail versus noise score for the video frame comprises setting the detail versus noise score to indicate a detail frame in response to the first number exceeding the second number by at least a threshold.

Further to the first embodiments, determining the detail versus noise score for the video frame comprises determining a temporal noise reduction level for the video frame based on the noise level of the video frame and a plurality of noise levels corresponding to a plurality of temporally adjacent frames of the video sequence, determining a spatial random noise likelihood and a detail level likelihood for the video frame based on the motion level, the spatial frequency information, and the average luma value, generating a candidate detail versus noise score for the video frame based on the temporal noise reduction level, the spatial random noise likelihood, and the detail level likelihood, and performing temporal filtering of the candidate detail versus noise score for the video frame based on candidate detail versus noise scores for the plurality of temporally adjacent frames of the video sequence, wherein the candidate detail versus noise score indicates a noise frame, candidate detail versus noise scores for a number of immediately temporally prior video frames all indicate detail frames, and temporal filtering the candidate detail versus noise score for the video frame comprises setting the detail versus noise score to indicate a detail frame in response to the number of immediately temporally prior video frames exceeding a threshold or wherein the candidate detail versus noise score indicates a noise frame, candidate detail versus noise scores a number of immediately temporarily prior video frames indicate a first number of detail frames and a second number of noise frames, and temporal filtering the candidate detail versus noise score for the video frame comprises setting the detail versus noise score to indicate a detail frame in response to the first number exceeding the second number by at least a threshold.

Further to the first embodiments, determining the detail versus noise score for the video frame comprises determining a temporal noise reduction level for the video frame based on the noise level of the video frame and a plurality of noise levels corresponding to a plurality of temporally adjacent frames of the video sequence, determining a spatial random noise likelihood and a detail level likelihood for the video frame based on the motion level, the spatial frequency information, and the average luma value, generating a candidate detail versus noise score for the video frame based on the temporal noise reduction level, the spatial random noise likelihood, and the detail level likelihood, and performing temporal filtering of the candidate detail versus noise score for the video frame based on candidate detail versus noise scores for the plurality of temporally adjacent frames of the video sequence, wherein the candidate detail versus noise score indicates a noise frame, candidate detail versus noise scores for a number of immediately temporally prior video frames all indicate detail frames, and temporal filtering the candidate detail versus noise score for the video frame comprises setting the detail versus noise score to indicate a detail frame in response to the number of immediately temporally prior video frames exceeding a threshold or wherein the candidate detail versus noise score indicates a noise frame, candidate detail versus noise scores a number of immediately temporarily prior video frames indicate a first number of detail frames and a second number of noise frames, and temporal filtering the candidate detail versus noise score for the video frame comprises setting the detail versus noise score to indicate a detail frame in response to the first number exceeding the second number by at least a threshold, wherein moving the candidate detail versus noise score toward the rolling average of probability of detail scores comprises setting the detail versus noise score to a value equal to the rolling average of probability of detail scores minus the predetermined threshold.

Further to the first embodiments, generating the sharpness enhancement control parameters is further based on the motion level for the video frame.

Further to the first embodiments, determining the detail versus noise score comprises mapping the noise level, the motion level, the average luma value, and the spatial frequency information to the detail versus noise score based on a pretrained probability mapping.

Further to the first embodiments, the detail versus noise score comprises a binary detail versus noise score and the sharpness enhancement control parameters comprise a first set of sharpness enhancement control parameters when the binary detail versus noise score indicates the video frame is a noise frame and a second set of sharpness enhancement control parameters different than the first set when the binary detail versus noise score indicates the video frame is a detail frame.

Further to the first embodiments, the detail versus noise score comprises a probability of detail score and generating the sharpness enhancement control parameters comprises mapping the probability of detail score to the sharpness enhancement control parameters based on a pretrained mapping.

Further to the first embodiments, the spatial frequency information comprises a frequency domain histogram for the video frame.

Further to the first embodiments, the method further comprises at least one of displaying the enhanced video frame or encoding the sequence of video frames based on the enhanced video frame.

In one or more second embodiments, a system for video processing comprises a storage to store a video frame of a sequence of video frames and a processor coupled to the memory, the processor to determine a noise level, a motion level, an average luma value, and spatial frequency information for the video frame of the sequence of video frames, to determine a detail versus noise score for the video frame based on the noise level, the motion level, the average luma value, and the spatial frequency information, to generate sharpness enhancement control parameters for the video frame based on the detail versus noise score for the video frame, and to enhance sharpness of the video frame based on the sharpness enhancement control parameters to generate an enhanced video frame.

Further to the second embodiments, the processor to determine the detail versus noise score for the video frame comprises the processor to determine a temporal noise reduction level for the video frame based on the noise level of the video frame and a plurality of noise levels corresponding to a plurality of temporally adjacent frames of the video sequence, to determine a spatial random noise likelihood and a detail level likelihood for the video frame based on the motion level, the spatial frequency information, and the average luma value, generate a candidate detail versus noise score for the video frame based on the temporal noise reduction level, the spatial random noise likelihood, and the detail level likelihood, and to perform temporal filtering of the candidate detail versus noise score for the video frame based on candidate detail versus noise scores for the plurality of temporally adjacent frames of the video sequence.

Further to the second embodiments, the processor to determine the detail versus noise score for the video frame comprises the processor to determine a temporal noise reduction level for the video frame based on the noise level of the video frame and a plurality of noise levels corresponding to a plurality of temporally adjacent frames of the video sequence, to determine a spatial random noise likelihood and a detail level likelihood for the video frame based on the motion level, the spatial frequency information, and the average luma value, generate a candidate detail versus noise score for the video frame based on the temporal noise reduction level, the spatial random noise likelihood, and the detail level likelihood, and to perform temporal filtering of the candidate detail versus noise score for the video frame based on candidate detail versus noise scores for the plurality of temporally adjacent frames of the video sequence, wherein the candidate detail versus noise score indicates a noise frame, candidate detail versus noise scores for a number of immediately temporally prior video frames all indicate detail frames, and temporal filtering the candidate detail versus noise score for the video frame comprises setting the detail versus noise score to indicate a detail frame in response to the number of immediately temporally prior video frames exceeding a threshold.

Further to the second embodiments, the processor to determine the detail versus noise score for the video frame comprises the processor to determine a temporal noise reduction level for the video frame based on the noise level of the video frame and a plurality of noise levels corresponding to a plurality of temporally adjacent frames of the video sequence, to determine a spatial random noise likelihood and a detail level likelihood for the video frame based on the motion level, the spatial frequency information, and the average luma value, generate a candidate detail versus noise score for the video frame based on the temporal noise reduction level, the spatial random noise likelihood, and the detail level likelihood, and to perform temporal filtering of the candidate detail versus noise score for the video frame based on candidate detail versus noise scores for the plurality of temporally adjacent frames of the video sequence, wherein the candidate detail versus noise score indicates a noise frame, candidate detail versus noise scores a number of immediately temporarily prior video frames indicate a first number of detail frames and a second number of noise frames, and temporal filtering the candidate detail versus noise score for the video frame comprises setting the detail versus noise score to indicate a detail frame in response to the first number exceeding the second number by at least a threshold.

Further to the second embodiments, the processor to determine the detail versus noise score for the video frame comprises the processor to determine a temporal noise reduction level for the video frame based on the noise level of the video frame and a plurality of noise levels corresponding to a plurality of temporally adjacent frames of the video sequence, to determine a spatial random noise likelihood and a detail level likelihood for the video frame based on the motion level, the spatial frequency information, and the average luma value, generate a candidate detail versus noise score for the video frame based on the temporal noise reduction level, the spatial random noise likelihood, and the detail level likelihood, and to perform temporal filtering of the candidate detail versus noise score for the video frame based on candidate detail versus noise scores for the plurality of temporally adjacent frames of the video sequence, wherein the candidate detail versus noise score has a value not within a predetermined threshold from a rolling average of probability of detail scores maintained for temporally prior video frames and the video frame, and temporal filtering the candidate detail versus noise score comprises the processor to move the candidate detail versus noise score toward the rolling average of probability of detail scores to generate the detail versus noise score.

Further to the second embodiments, the processor to determine the detail versus noise score for the video frame comprises the processor to determine a temporal noise reduction level for the video frame based on the noise level of the video frame and a plurality of noise levels corresponding to a plurality of temporally adjacent frames of the video sequence, to determine a spatial random noise likelihood and a detail level likelihood for the video frame based on the motion level, the spatial frequency information, and the average luma value, generate a candidate detail versus noise score for the video frame based on the temporal noise reduction level, the spatial random noise likelihood, and the detail level likelihood, and to perform temporal filtering of the candidate detail versus noise score for the video frame based on candidate detail versus noise scores for the plurality of temporally adjacent frames of the video sequence, wherein the candidate detail versus noise score has a value not within a predetermined threshold from a rolling average of probability of detail scores maintained for temporally prior video frames and the video frame, and temporal filtering the candidate detail versus noise score comprises the processor to move the candidate detail versus noise score toward the rolling average of probability of detail scores to generate the detail versus noise score, wherein moving the candidate detail versus noise score toward the rolling average of probability of detail scores comprises setting the detail versus noise score to a value equal to the rolling average of probability of detail scores minus the predetermined threshold.

Further to the second embodiments, determining the detail versus noise score comprises mapping the noise level, the motion level, the average luma value, and the spatial frequency information to the detail versus noise score based on a pretrained probability mapping.

Further to the second embodiments, the detail versus noise score comprises a binary detail versus noise score and the sharpness enhancement control parameters comprise a first set of sharpness enhancement control parameters when the binary detail versus noise score indicates the video frame is a noise frame and a second set of sharpness enhancement control parameters different than the first set when the binary detail versus noise score indicates the video frame is a detail frame.

Further to the second embodiments, wherein the detail versus noise score comprises a probability of detail score and the processor to generate the sharpness enhancement control parameters comprises the processor to map the probability of detail score to the sharpness enhancement control parameters based on a pretrained mapping.

In one or more third embodiments, a system comprises means for determining a noise level, a motion level, an average luma value, and spatial frequency information for a video frame of a sequence of video frames, means for determining a detail versus noise score for the video frame based on the noise level, the motion level, the average luma value, and the spatial frequency information, means for generating sharpness enhancement control parameters for the video frame based on the detail versus noise score for the video frame, and means for enhancing sharpness of the video frame based on the sharpness enhancement control parameters to generate an enhanced video frame.

Further to the third embodiments, the means for determining the detail versus noise score for the video frame comprise means for determining a temporal noise reduction level for the video frame based on the noise level of the video frame and a plurality of noise levels corresponding to a plurality of temporally adjacent frames of the video sequence, means for determining a spatial random noise likelihood and a detail level likelihood for the video frame based on the motion level, the spatial frequency information, and the average luma value, means for generating a candidate detail versus noise score for the video frame based on the temporal noise reduction level, the spatial random noise likelihood, and the detail level likelihood, and means for performing temporal filtering of the candidate detail versus noise score for the video frame based on candidate detail versus noise scores for the plurality of temporally adjacent frames of the video sequence.

Further to the third embodiments, the means for determining the detail versus noise score for the video frame comprise means for determining a temporal noise reduction level for the video frame based on the noise level of the video frame and a plurality of noise levels corresponding to a plurality of temporally adjacent frames of the video sequence, means for determining a spatial random noise likelihood and a detail level likelihood for the video frame based on the motion level, the spatial frequency information, and the average luma value, means for generating a candidate detail versus noise score for the video frame based on the temporal noise reduction level, the spatial random noise likelihood, and the detail level likelihood, and means for performing temporal filtering of the candidate detail versus noise score for the video frame based on candidate detail versus noise scores for the plurality of temporally adjacent frames of the video sequence, wherein the candidate detail versus noise score indicates a noise frame, candidate detail versus noise scores for a number of immediately temporarily prior video frames all indicate detail frames, and the means for temporal filtering the candidate detail versus noise score for the video frame comprise means for setting the detail versus noise score to indicate a detail frame in response to the number of immediately temporarily prior video frames exceeding a threshold.

Further to the third embodiments, the means for determining the detail versus noise score for the video frame comprise means for determining a temporal noise reduction level for the video frame based on the noise level of the video frame and a plurality of noise levels corresponding to a plurality of temporally adjacent frames of the video sequence, means for determining a spatial random noise likelihood and a detail level likelihood for the video frame based on the motion level, the spatial frequency information, and the average luma value, means for generating a candidate detail versus noise score for the video frame based on the temporal noise reduction level, the spatial random noise likelihood, and the detail level likelihood, and means for performing temporal filtering of the candidate detail versus noise score for the video frame based on candidate detail versus noise scores for the plurality of temporally adjacent frames of the video sequence, wherein the candidate detail versus noise score indicates a noise frame, candidate detail versus noise scores a number of immediately temporarily prior video frames indicate a first number of detail frames and a second number of noise frames, and the means for temporal filtering the candidate detail versus noise score for the video frame comprise means for setting the detail versus noise score to indicate a detail frame in response to the first number exceeding the second number by at least a threshold.

Further to the third embodiments, the means for determining the detail versus noise score for the video frame comprise means for determining a temporal noise reduction level for the video frame based on the noise level of the video frame and a plurality of noise levels corresponding to a plurality of temporally adjacent frames of the video sequence, means for determining a spatial random noise likelihood and a detail level likelihood for the video frame based on the motion level, the spatial frequency information, and the average luma value, means for generating a candidate detail versus noise score for the video frame based on the temporal noise reduction level, the spatial random noise likelihood, and the detail level likelihood, and means for performing temporal filtering of the candidate detail versus noise score for the video frame based on candidate detail versus noise scores for the plurality of temporally adjacent frames of the video sequence, wherein the candidate detail versus noise score has a value not within a predetermined threshold from a rolling average of probability of detail scores maintained for temporally prior video frames and the video frame, and the means for temporal filtering the candidate detail versus noise score comprise means for moving the candidate detail versus noise score toward the rolling average of probability of detail scores to generate the detail versus noise score.

Further to the third embodiments, the detail versus noise score comprises a binary detail versus noise score and the sharpness enhancement control parameters comprise a first set of sharpness enhancement control parameters when the binary detail versus noise score indicates the video frame is a noise frame and a second set of sharpness enhancement control parameters different than the first set when the binary detail versus noise score indicates the video frame is a detail frame.

Further to the third embodiments, the detail versus noise score comprises a probability of detail score and the means for generating the sharpness enhancement control parameters comprises means for mapping the probability of detail score to the sharpness enhancement control parameters based on a pretrained mapping.

Further to the third embodiments, the system further comprises at least one of means for displaying the enhanced video frame or means for encoding the sequence of video frames based on the enhanced video frame.

In one or more fourth embodiments, at least one machine readable medium comprises a plurality of instructions that, in response to being executed on a computing device, cause the computing device to perform video processing by determining a noise level, a motion level, an average luma value, and spatial frequency information for a video frame of a sequence of video frames, determining a detail versus noise score for the video frame based on the noise level, the motion level, the average luma value, and the spatial frequency information, generating sharpness enhancement control parameters for the video frame based on the detail versus noise score for the video frame, and enhancing sharpness of the video frame based on the sharpness enhancement control parameters to generate an enhanced video frame.

Further to the fourth embodiments, determining the detail versus noise score for the video frame comprises determining a temporal noise reduction level for the video frame based on the noise level of the video frame and a plurality of noise levels corresponding to a plurality of temporally adjacent frames of the video sequence, determining a spatial random noise likelihood and a detail level likelihood for the video frame based on the motion level, the spatial frequency information, and the average luma value, generating a candidate detail versus noise score for the video frame based on the temporal noise reduction level, the spatial random noise likelihood, and the detail level likelihood, and performing temporal filtering of the candidate detail versus noise score for the video frame based on candidate detail versus noise scores for the plurality of temporally adjacent frames of the video sequence.

Further to the fourth embodiments, determining the detail versus noise score for the video frame comprises determining a temporal noise reduction level for the video frame based on the noise level of the video frame and a plurality of noise levels corresponding to a plurality of temporally adjacent frames of the video sequence, determining a spatial random noise likelihood and a detail level likelihood for the video frame based on the motion level, the spatial frequency information, and the average luma value, generating a candidate detail versus noise score for the video frame based on the temporal noise reduction level, the spatial random noise likelihood, and the detail level likelihood, and performing temporal filtering of the candidate detail versus noise score for the video frame based on candidate detail versus noise scores for the plurality of temporally adjacent frames of the video sequence, wherein the candidate detail versus noise score indicates a noise frame, candidate detail versus noise scores for a number of immediately temporally prior video frames all indicate detail frames, and temporal filtering the candidate detail versus noise score for the video frame comprises setting the detail versus noise score to indicate a detail frame in response to the number of immediately temporally prior video frames exceeding a threshold.

Further to the fourth embodiments, determining the detail versus noise score for the video frame comprises determining a temporal noise reduction level for the video frame based on the noise level of the video frame and a plurality of noise levels corresponding to a plurality of temporally adjacent frames of the video sequence, determining a spatial random noise likelihood and a detail level likelihood for the video frame based on the motion level, the spatial frequency information, and the average luma value, generating a candidate detail versus noise score for the video frame based on the temporal noise reduction level, the spatial random noise likelihood, and the detail level likelihood, and performing temporal filtering of the candidate detail versus noise score for the video frame based on candidate detail versus noise scores for the plurality of temporally adjacent frames of the video sequence, wherein the candidate detail versus noise score indicates a noise frame, candidate detail versus noise scores a number of immediately temporarily prior video frames indicate a first number of detail frames and a second number of noise frames, and temporal filtering the candidate detail versus noise score for the video frame comprises setting the detail versus noise score to indicate a detail frame in response to the first number exceeding the second number by at least a threshold.

Further to the fourth embodiments, determining the detail versus noise score for the video frame comprises determining a temporal noise reduction level for the video frame based on the noise level of the video frame and a plurality of noise levels corresponding to a plurality of temporally adjacent frames of the video sequence, determining a spatial random noise likelihood and a detail level likelihood for the video frame based on the motion level, the spatial frequency information, and the average luma value, generating a candidate detail versus noise score for the video frame based on the temporal noise reduction level, the spatial random noise likelihood, and the detail level likelihood, and performing temporal filtering of the candidate detail versus noise score for the video frame based on candidate detail versus noise scores for the plurality of temporally adjacent frames of the video sequence, wherein the candidate detail versus noise score has a value not within a predetermined threshold from a rolling average of probability of detail scores maintained for temporally prior video frames and the video frame, and temporal filtering the candidate detail versus noise score comprises moving the candidate detail versus noise score toward the rolling average of probability of detail scores to generate the detail versus noise score.

Further to the fourth embodiments, the detail versus noise score comprises a binary detail versus noise score and the sharpness enhancement control parameters comprise a first set of sharpness enhancement control parameters when the binary detail versus noise score indicates the video frame is a noise frame and a second set of sharpness enhancement control parameters different than the first set when the binary detail versus noise score indicates the video frame is a detail frame.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for video processing comprising:
   determining a noise level, a motion level, an average luma value, and spatial frequency information for a video frame of a sequence of video frames;
   determining a detail versus noise score for the video frame by determining a temporal noise reduction level for the video frame based on the noise level of the frame and a plurality of noise levels corresponding to a plurality of temporally adjacent video frames of the sequence, determining a spatial random noise likelihood and a detail level likelihood for the video frame based on the motion level, the spatial frequency information, and the average luma value, generating a candidate detail versus noise score for the video frame based on the temporal noise reduction level, the spatial random noise likelihood, and the detail level likelihood, and performing temporal filtering of the candidate detail versus noise score for the frame based on candidate detail versus noise scores for the plurality of temporally adjacent video frames of the sequence to generate the detail versus noise score;
   generating sharpness enhancement control parameters for the video frame based on the detail versus noise score for the video frame; and
   enhancing sharpness of the video frame based on the sharpness enhancement control parameters to generate an enhanced video frame.

2. The method of claim 1, wherein the candidate detail versus noise score indicates a noise frame, candidate detail versus noise scores for a number of immediately temporally prior video frames all indicate detail frames, and temporal filtering the candidate detail versus noise score for the video frame comprises setting the detail versus noise score to indicate a detail frame in response to the number of immediately temporally prior video frames exceeding a threshold.

3. The method of claim 1, wherein the candidate detail versus noise score indicates a noise frame, candidate detail versus noise scores for a number of immediately temporarily prior video frames indicate a first number of detail frames and a second number of noise frames, and temporal filtering the candidate detail versus noise score for the video frame comprises setting the detail versus noise score to indicate a detail frame in response to the first number exceeding the second number by at least a threshold.

4. The method of claim 1, wherein the candidate detail versus noise score has a value not within a predetermined threshold from a rolling average of probability of detail scores maintained for temporally prior video frames and the video frame, and temporal filtering the candidate detail versus noise score comprises moving the candidate detail versus noise score toward the rolling average of probability of detail scores to generate the detail versus noise score.

5. The method of claim 4, wherein moving the candidate detail versus noise score toward the rolling average of probability of detail scores comprises setting the detail versus noise score to a value equal to the rolling average of probability of detail scores minus the predetermined threshold.

6. The method of claim 1, wherein generating the sharpness enhancement control parameters is further based on the motion level for the video frame.

7. The method of claim 1, wherein determining at least one of the spatial random noise likelihood or the detail level likelihood comprises mapping the motion level, the average luma value, and the spatial frequency information to the spatial random noise likelihood or the detail level likelihood based on a pretrained mapping.

8. The method of claim 1, wherein the detail versus noise score comprises a binary detail versus noise score and the sharpness enhancement control parameters comprise a first set of sharpness enhancement control parameters when the binary detail versus noise score indicates the video frame is a noise frame and a second set of sharpness enhancement control parameters different than the first set when the binary detail versus noise score indicates the video frame is a detail frame.

9. The method of claim 1, wherein the detail versus noise score comprises a probability of detail score and generating the sharpness enhancement control parameters comprises mapping the probability of detail score to the sharpness enhancement control parameters based on a pretrained mapping.

10. The method of claim 1, wherein the spatial frequency information comprises a frequency domain histogram for the video frame.

11. The method of claim 1, further comprising at least one of displaying the enhanced video frame or encoding the sequence of video frames based on the enhanced video frame.

12. A system for video processing comprising:
a storage to store a video frame of a sequence of video frames; and
a processor coupled to the memory, the processor to:
determine a noise level, a motion level, an average luma value, and spatial frequency information for the video frame of the sequence of video frames;
wherein the processor to determine the detail versus noise score comprises the processor to determine a temporal noise reduction level for the video frame based on the noise level of the frame and a plurality of noise levels corresponding to a plurality of temporally adjacent video frames of the sequence, determine a spatial random noise likelihood and a detail level likelihood for the video frame based on the motion level, the spatial frequency information, and the average luma value, generate a candidate detail versus noise score for the video frame based on the temporal noise reduction level, the spatial random noise likelihood, and the detail level likelihood, and perform temporal filtering of the candidate detail versus noise score for the frame based on candidate detail versus noise scores for the plurality of temporally adjacent video frames of the sequence to generate the detail versus noise score;
generate sharpness enhancement control parameters for the video frame based on the detail versus noise score for the video frame; and
enhance sharpness of the video frame based on the sharpness enhancement control parameters to generate an enhanced video frame.

13. The system of claim 12, wherein the candidate detail versus noise score indicates a noise frame, candidate detail versus noise scores for a number of immediately temporally prior video frames all indicate detail frames, and temporal filtering the candidate detail versus noise score for the video frame comprises the processor to set the detail versus noise score to indicate a detail frame in response to the number of immediately temporally prior video frames exceeding a threshold.

14. The system of claim 12, wherein the candidate detail versus noise score indicates a noise frame, candidate detail versus noise scores for a number of immediately temporarily prior video frames indicate a first number of detail frames and a second number of noise frames, and temporal filtering the candidate detail versus noise score for the video frame comprises the processor to set the detail versus noise score to indicate a detail frame in response to the first number exceeding the second number by at least a threshold.

15. The system of claim 12, wherein the candidate detail versus noise score has a value not within a predetermined threshold from a rolling average of probability of detail scores maintained for temporally prior video frames and the video frame, and temporal filtering the candidate detail versus noise score comprises the processor to move the candidate detail versus noise score toward the rolling average of probability of detail scores to generate the detail versus noise score.

16. The system of claim 12, wherein the detail versus noise score comprises a binary detail versus noise score and the sharpness enhancement control parameters comprise a first set of sharpness enhancement control parameters when the binary detail versus noise score indicates the video frame is a noise frame and a second set of sharpness enhancement control parameters different than the first set when the binary detail versus noise score indicates the video frame is a detail frame.

17. The system of claim 12, wherein the detail versus noise score comprises a probability of detail score and the processor to generate the sharpness enhancement control parameters comprises the processor to map the probability of detail score to the sharpness enhancement control parameters based on a pretrained mapping.

18. At least one non-transitory machine readable medium comprising a plurality of instructions that, in response to being executed on a computing device, cause the computing device to perform video processing by:
determining a noise level, a motion level, an average luma value, and spatial frequency information for a video frame of a sequence of video frames;
determining a detail versus noise score for the video frame by determining a temporal noise reduction level for the video frame based on the noise level of the frame and a plurality of noise levels corresponding to a plurality of temporally adjacent video frames of the sequence, determining a spatial random noise likelihood and a detail level likelihood for the video frame based on the motion level, the spatial frequency information, and the average luma value, generating a candidate detail versus noise score for the video frame based on the temporal noise reduction level, the spatial random noise likelihood, and the detail level likelihood, and performing temporal filtering of the candidate detail versus noise score for the frame based on candidate detail versus noise scores for the plurality of temporally adjacent video frames of the sequence to generate the detail versus noise score;
generating sharpness enhancement control parameters for the video frame based on the detail versus noise score for the video frame; and
enhancing sharpness of the video frame based on the sharpness enhancement control parameters to generate an enhanced video frame.

19. The non-transitory machine readable medium of claim 18, wherein the candidate detail versus noise score indicates a noise frame, candidate detail versus noise scores for a number of immediately temporally prior video frames all indicate detail frames, and temporal filtering the candidate detail versus noise score for the video frame comprises setting the detail versus noise score to indicate a detail frame in response to the number of immediately temporally prior video frames exceeding a threshold.

20. The non-transitory machine readable medium of claim 19, wherein the candidate detail versus noise score indicates a noise frame, candidate detail versus noise scores for a number of immediately temporarily prior video frames indicate a first number of detail frames and a second number of noise frames, and temporal filtering the candidate detail versus noise score for the video frame comprises setting the detail versus noise score to indicate a detail frame in response to the first number exceeding the second number by at least a threshold.

21. The non-transitory machine readable medium of claim 19, wherein the candidate detail versus noise score has a value not within a predetermined threshold from a rolling average of probability of detail scores maintained for temporally prior video frames and the video frame, and temporal filtering the candidate detail versus noise score comprises moving the candidate detail versus noise score toward the rolling average of probability of detail scores to generate the detail versus noise score.

22. The non-transitory machine readable medium of claim 18, wherein the detail versus noise score comprises a binary detail versus noise score and the sharpness enhancement control parameters comprise a first set of sharpness enhancement control parameters when the binary detail versus noise score indicates the video frame is a noise frame and a second set of sharpness enhancement control parameters different than the first set when the binary detail versus noise score indicates the video frame is a detail frame.

* * * * *